(12) United States Patent
Mori et al.

(10) Patent No.: US 10,994,745 B2
(45) Date of Patent: May 4, 2021

(54) INFORMATION ESTIMATING SYSTEM, INFORMATION ESTIMATING METHOD AND RECORDING MEDIUM

(71) Applicant: Panasonic Intellectual Property Management Co., Ltd., Osaka (JP)

(72) Inventors: Toshiya Mori, Osaka (JP); Nobuyuki Nakano, Aichi (JP); Masanaga Tsuji, Osaka (JP); Tadashi Shibata, Osaka (JP); Akira Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 220 days.

(21) Appl. No.: 16/317,528

(22) PCT Filed: Jun. 16, 2017

(86) PCT No.: PCT/JP2017/022309
§ 371 (c)(1),
(2) Date: Jan. 11, 2019

(87) PCT Pub. No.: WO2018/016248
PCT Pub. Date: Jan. 25, 2018

(65) Prior Publication Data
US 2019/0283773 A1    Sep. 19, 2019

(30) Foreign Application Priority Data

Jul. 22, 2016 (JP) .............................. JP2016-144355

(51) Int. Cl.
*B60W 50/10* (2012.01)
*B60W 50/08* (2020.01)
(Continued)

(52) U.S. Cl.
CPC .......... *B60W 50/10* (2013.01); *B60W 50/085* (2013.01); *G01C 21/36* (2013.01);
(Continued)

(58) Field of Classification Search
CPC .............. B60W 50/10; B60W 50/085; B60W 2050/0082; G01C 21/36; G06F 3/01; G06N 3/08
See application file for complete search history.

(56) References Cited

U.S. PATENT DOCUMENTS 9,288,270 B1\* 3/2016 Penilla ................. H04B 1/3822
2010/0228404 A1\* 9/2010 Link, II .............. G06F 9/44542
701/1

(Continued)

FOREIGN PATENT DOCUMENTS

JP      8-271275      10/1996
JP      2008-195295    8/2008
(Continued)

OTHER PUBLICATIONS

International Search Report of PCT application No. PCT/JP2017/022309 dated Sep. 19, 2017.

*Primary Examiner* — Sze-Hon Kong
(74) *Attorney, Agent, or Firm* — Greenblum & Bernstein, P.L.C.

(57) ABSTRACT

An information estimating system includes an acquisition unit configured to acquire an operation item for vehicle-mounted equipment mounted on a vehicle and a vehicle environment state, which is at least one of a vehicle status and a traveling state of the vehicle when the operation item (Continued)

| | Vehicle environment state | Latitude of 35 degrees, longitude of 135 degrees | | | Latitude of 40 degrees, longitude of 135 degrees | | | ... |
|---|---|---|---|---|---|---|---|---|
| | Operation item | Turning up audio volume | Opening window | Turning off air conditioner | Turning up audio volume | Opening window | Turning off air conditioner | ... |
| | Driver a | 3 | 1 | 5 | 1 | 1 | 5 | ... |
| | Driver b | 4 | 2 | 7 | 2 | 0 | 3 | ... |
| Model of driver y ← | Driver c | 3 | 2 | 2 | 1 | 2 | 8 | ... |
| ← | Driver d | 5 | 2 | 2 | 5 | 2 | 2 | ... |
| ← | Driver e | 7 | 2 | 2 | 5 | 0 | 3 | ... |
| | Driver f | 5 | 2 | 5 | 4 | 1 | 1 | ... |
| | ... | ... | ... | ... | ... | ... | ... | ... | is operated for each of a plurality of drivers, a learning unit configured to learn the operation item and the vehicle environment state of each of the plurality of drivers acquired by the acquisition unit in association with each other, and an estimator configured to estimate the operation item for the vehicle environment state at a predetermined time point of a specific driver based on the learned result learned by the learning unit.

6 Claims, 11 Drawing Sheets

(51) Int. Cl.
G06N 3/08 (2006.01)
G01C 21/36 (2006.01)
G06F 3/01 (2006.01)
B60W 50/00 (2006.01)

(52) U.S. Cl.
CPC ............... *G06F 3/01* (2013.01); *G06N 3/08* (2013.01); *B60W 2050/0082* (2013.01)

(56) References Cited

U.S. PATENT DOCUMENTS

| | | | |
|---|---|---|---|
| 2013/0124009 A1* | 5/2013 | Esler | H04L 67/125 701/2 |
| 2014/0078044 A1 | 3/2014 | Yamashita | |
| 2015/0160019 A1* | 6/2015 | Biswal | B60W 50/00 701/1 |
| 2015/0191178 A1* | 7/2015 | Roy | H04W 4/027 701/36 |
| 2017/0369010 A1* | 12/2017 | Tarte | B60L 58/12 |
| 2018/0259956 A1* | 9/2018 | Kawamoto | B60W 50/082 |
| 2018/0284774 A1* | 10/2018 | Kawamoto | B60W 30/085 |

FOREIGN PATENT DOCUMENTS

| | | |
|---|---|---|
| JP | 2008-232912 | 10/2008 |
| JP | 2010-256943 | 11/2010 |
| JP | 2011-137638 | 7/2011 |
| JP | 4729522 B | 7/2011 |
| JP | 2013-117855 | 6/2013 |
| JP | 2014-059803 | 4/2014 |

\* cited by examiner

FIG. 2

| Operation item | Date | Time | Latitude | Longitude | Velocity [km/h] | Remaining amount of gasoline[%] | Air conditioner | Window (right front) | ... |
|---|---|---|---|---|---|---|---|---|---|
| Turning up audio volume | 20160707 | 15:20:00 | 35.00 | 135.00 | 30 | 80 | ON | Close | |
| Opening window | 20160707 | 15:20:20 | 35.00 | 135.00 | 40 | 79 | ON | Open | |
| Turning off air conditioner | 20160707 | 15:20:40 | 35.00 | 135.00 | 40 | 79 | OFF | Open | |

FIG. 3

| Vehicle environment state | Latitude of 35 degrees, longitude of 135 degrees | | | Latitude of 40 degrees, longitude of 135 degrees | | | ... |
|---|---|---|---|---|---|---|---|
| Operation item | Turning up audio volume | Opening window | Turning off air conditioner | Turning up audio volume | Opening window | Turning off air conditioner | ... |
| Driver x | 3 | 1 | 5 | 2 | 2 | 1 | ... |
| Driver y | 9 | 1 | 2 | 0 | 0 | 1 | ... |

FIG. 4

| Vehicle environment state | Latitude of 35 degrees, longitude of 135 degrees ||| Latitude of 40 degrees, longitude of 135 degrees |||  |
|---|---|---|---|---|---|---|---|
| Operation item | Turning up audio volume | Opening window | Turning off air conditioner | Turning up audio volume | Opening window | Turning off air conditioner | ... |
| Driver a | 3 | 1 | 5 | 1 | 1 | 5 | ... |
| Driver b | 4 | 2 | 7 | 2 | 0 | 3 | ... |
| Driver c | 3 | 2 | 2 | 1 | 2 | 8 | ... |
| Driver d | 5 | 2 | 2 | 5 | 2 | 2 | ... |
| Driver e | 7 | 2 | 2 | 5 | 0 | 3 | ... |
| Driver f | 5 | 2 | 5 | 4 | 1 | 1 | ... |
| ... | ... | ... | ... | ... | ... | ... | ... |

Model A: Drivers a–c
Model B: Drivers d–f

FIG. 5

| Vehicle environment state | Latitude of 35 degrees, longitude of 135 degrees | | | Latitude of 40 degrees, longitude of 135 degrees | | | ... |
|---|---|---|---|---|---|---|---|
| Operation item | Turning up audio volume | Opening window | Turning off air conditioner | Turning up audio volume | Opening window | Turning off air conditioner | ... |
| Model A | 3.3 | 1.7 | 4.6 | 1.3 | 1 | 5.3 | ... |
| Model B | 5.7 | 2 | 3 | 4.7 | 1 | 2 | ... |

FIG. 6

| Vehicle environment state | Latitude of 35 degrees, longitude of 135 degrees | Latitude of 40 degrees, longitude of 135 degrees | ... |
|---|---|---|---|
| Model A | Turning off air conditioner | Turning off air conditioner | ... |
| Model B | Turning up audio volume | Turning up audio volume | ... |

FIG. 8

| Vehicle environment state | Latitude of 35 degrees, longitude of 135 degrees | | | Latitude of 40 degrees, longitude of 135 degrees | | | ... |
|---|---|---|---|---|---|---|---|
| Operation item | Turning up audio volume | Opening window | Turning off air conditioner | Turning up audio volume | Opening window | Turning off air conditioner | ... |
| Model of driver y | 5 | 2 | 2 | 3.7 | 1.3 | 4.3 | ... |

INFORMATION ESTIMATING SYSTEM, INFORMATION ESTIMATING METHOD AND RECORDING MEDIUM

CROSS-REFERENCE TO RELATED APPLICATIONS

This application is a U.S. national stage application of the PCT International Application No. PCT/JP2017/022309 filed on Jun. 16, 2017, which claims the benefit of foreign priority of Japanese patent application No. 2016-144355 filed on Jul. 22, 2016, the contents all of which are incorporated herein by reference.

TECHNICAL FIELD

The present invention relates to an information estimating system, an information estimating method and a program for estimating information relating to vehicle-mounted equipment.

BACKGROUND ART

In the related art, a navigation apparatus capable of estimating operations of a driver for vehicle-mounted equipment performed by users in advance to aid the operations in order to enhance usability during driving of vehicles (for example, see Patent Literature 1).

CITATION LIST

Patent Literature

PTL 1: Unexamined Japanese Patent Publication No. 2008-232912

SUMMARY OF THE INVENTION

The present invention relates to an information estimating system, an information estimating method and a program capable of estimating an operation for vehicle-mounted equipment in a manner suitable to conditions of a driver.

The information estimating system according to an aspect of the present invention is provided with an acquisition unit, a learning unit, and an estimator. The acquisition unit is configured to acquire at least one operation item for each item of vehicle-mounted equipment mounted on a vehicle and at least one vehicle environment state including at least one of a peripheral status of the vehicle and a traveling state of the vehicle when the at least one operation item is operated for each of a plurality of drivers. The learning unit is configured to learn the at least one operation item and the at least one vehicle environment state of each of the plurality of drivers in association with each other to construct a learned result. The at least one operation item and the at least one vehicle environment state of each of the plurality of drivers are acquired by the acquisition unit. An estimator is configured to estimate one of the at least one operation item for a vehicle environment state of a specific driver at a predetermined time point from the at least one vehicle environment state based on the learned result to obtain an estimated operation item.

An information estimating method according to an aspect of the present invention includes acquiring at least one vehicle environment state including at least one of at least one operation item for each item of vehicle-mounted equipment mounted on a vehicle and at least one vehicle environment state including at least one of a peripheral status of the vehicle and a traveling state of the vehicle when the at least one operation item is operated for each of a plurality of drivers. The information estimating method includes learning the at least one operation item and the at least one vehicle environment state of each of the plurality of drivers in association with each other to construct a learned result, the at least one operation item and the at least one vehicle environment state of each of the plurality of drivers being acquired by the acquiring. The information estimating method includes estimating one of the at least one operation item for a vehicle environment state of a specific driver at a predetermined time point from the at least one vehicle environment state based on the learned result.

A program according to an aspect of the present invention causes a computer to execute: acquiring at least one vehicle environment state including at least one of at least one operation item for each item of vehicle-mounted equipment mounted on a vehicle and at least one vehicle environment state including at least one of a peripheral status of the vehicle and a traveling state of the vehicle when the at least one operation item is operated for each of a plurality of drivers; learning the at least one operation item and the at least one vehicle environment state of each of the plurality of drivers in association with each other to construct a learned result, the at least one operation item and the at least one vehicle environment state of each of the plurality of drivers being acquired by the acquiring; and estimating one of the at least one operation item for a vehicle environment state of a specific driver at a predetermined time point from the at least one vehicle environment state based on the learned result.

In this aspect, since the learning unit learns the operation item and the vehicle environment state of each of the plurality of drivers acquired by the acquisition unit in association with each other, learning considering not only the operation item of the specific driver, but also the operation items of other drivers is enabled. Then, based on the learned result, the estimator estimates the operation item for the vehicle environment state of the specific driver at the predetermined time point. Accordingly, a tendency of the specific driver in terms of operation and tendencies of other drivers in terms of operation may be reflected to estimate the operation item of the specific driver at the predetermined time point. Therefore, the operation with respect to the vehicle-mounted equipment suitable to the status of the driver may be estimated without using the visual line of the driver.

The information estimating system may be configured as described below. The information estimating system further includes a detector configured to detect the vehicle environment state of the specific driver at the predetermined time point from the at least one vehicle environment state and obtain a detected vehicle environment state. The acquisition unit acquires at least one personal operation history including the at least one operation item and the at least one vehicle environment state in one-to-one correspondence for each of the plurality of drivers. The learning unit models the at least one personal operation history to construct a driver model indicating a relationship between the at least one operation item and the at least one vehicle environment state of at least part of the plurality of drivers as the learned result. The estimator obtains one of the at least one operation item associated with the vehicle environment state detected as the operation item estimated for the vehicle environment state of the specific driver at the predetermined time point in the driver model.

In this configuration, the operation item of the specific driver at the predetermined time point may be estimated by using the driver model. Therefore, even when the available personal operation history of the specific driver is not sufficient for estimation of the operation item, the operation item of the specific driver at the predetermined time point may be estimated.

The estimator may not employ the estimated operation item when a frequency of the estimated operation item does not exceed a predetermined threshold.

In this configuration, when the frequency of the estimated operation item does not exceed the predetermined threshold, the estimator does not employ the operation item. In other words, the estimator employs the operation item when the frequency of the estimated operation item exceeds the predetermined threshold, and thus the operation item in which tendencies of the plurality of drivers stand out may be employed.

The learning unit may be configured as described below. The learning unit includes a first learning unit and a second learning unit. The first learning unit is configured to make a neural network learn the at least one vehicle environment state and the at least one operation item acquired by the acquisition unit for each of the plurality of drivers. The second learning unit uses the at least one vehicle environment state and the at least one operation item acquired by the acquisition unit for the specific driver and constructs the neural network dedicated for the specific driver as the learned result. The estimator uses the dedicated neural network to obtain one of the at least one operation item for the vehicle environment state of the specific driver at the predetermined time point as the estimated operation item.

In this configuration, since the operation item of the specific driver at the predetermined time point may be estimated by using the neural network, the estimation is achieved adequately.

The information estimating system may further include a notifier configured to notify the operation item estimated by the estimator.

In this configuration, the estimated operation item is notified by the notifier, and thus the driver can figure out which operation item is executed in advance.

The information estimating system is also provided with an equipment controller configured to control the vehicle-mounted equipment based on the operation item estimated by the estimator.

In this configuration, since the equipment controller controls the vehicle-mounted equipment based on the operation item estimated by the estimator, the estimated operation item may be executed automatically.

Those comprehensive or specific aspects may be implemented by a system, a method, an integrated circuit, a computer program, or a non-transitory recording medium such as a computer readable CD-ROM, or implemented by any combination of the system, the method, the integrated circuit, the computer program, and the recording medium.

According to the present invention, the operation for the vehicle-mounted equipment suitable for the driver may be estimated.

BRIEF DESCRIPTION OF DRAWINGS

FIG. 2 is an explanatory diagram illustrating one example of a personal operation history according to the first exemplary embodiment.

FIG. 3 is a diagram illustrating one example of the personal operation history according to the first exemplary embodiment.

FIG. 4 is a diagram illustrating a method for constructing a clustering type driver model according to the first exemplary embodiment.

FIG. 5 is a diagram illustrating one example of the constructed clustering type driver model according to the first exemplary embodiment.

FIG. 6 is a diagram illustrating another example of the constructed clustering type driver model according to the first exemplary embodiment.

FIG. 8 is a diagram illustrating one example of the constructed individually-adapted type driver model according to the first exemplary embodiment.

DESCRIPTION OF EMBODIMENTS

Before exemplary embodiments of the present invention are described, a problem found in a conventional system will be discussed briefly. A navigation apparatus disclosed in the above-described PTL 1 (that is, information estimating system) detects a visual line of a driver and estimates an operation for vehicle-mounted equipment based on the detected visual line. However, as a matter of fact, the operation intended by the driver cannot be estimated accurately only by the visual line.

Hereinafter, the exemplary embodiments of the present invention will be described in detail with reference to the drawings. The exemplary embodiments described below are only illustrative, and do not limit the scope of the present invention. Specifically, the following exemplary embodiments provide a comprehensive, specific example of the present invention. Numerical values, shapes, materials, constituent elements, arrangement positions and connection modes of the constituent elements, steps, and order of the steps, for example, illustrated in the following exemplary embodiments are merely examples, and therefore are not intended to limit the present invention. Among the constituent elements in the following exemplary embodiments, constituent elements not recited in the independent claim indicating the broadest concept are described as optional constituent elements.

The drawings are schematic diagrams, and illustration is not necessarily strictly accurate. Further, in each diagram, the same components are denoted by the same reference marks.

First Exemplary Embodiment

Figure 1:
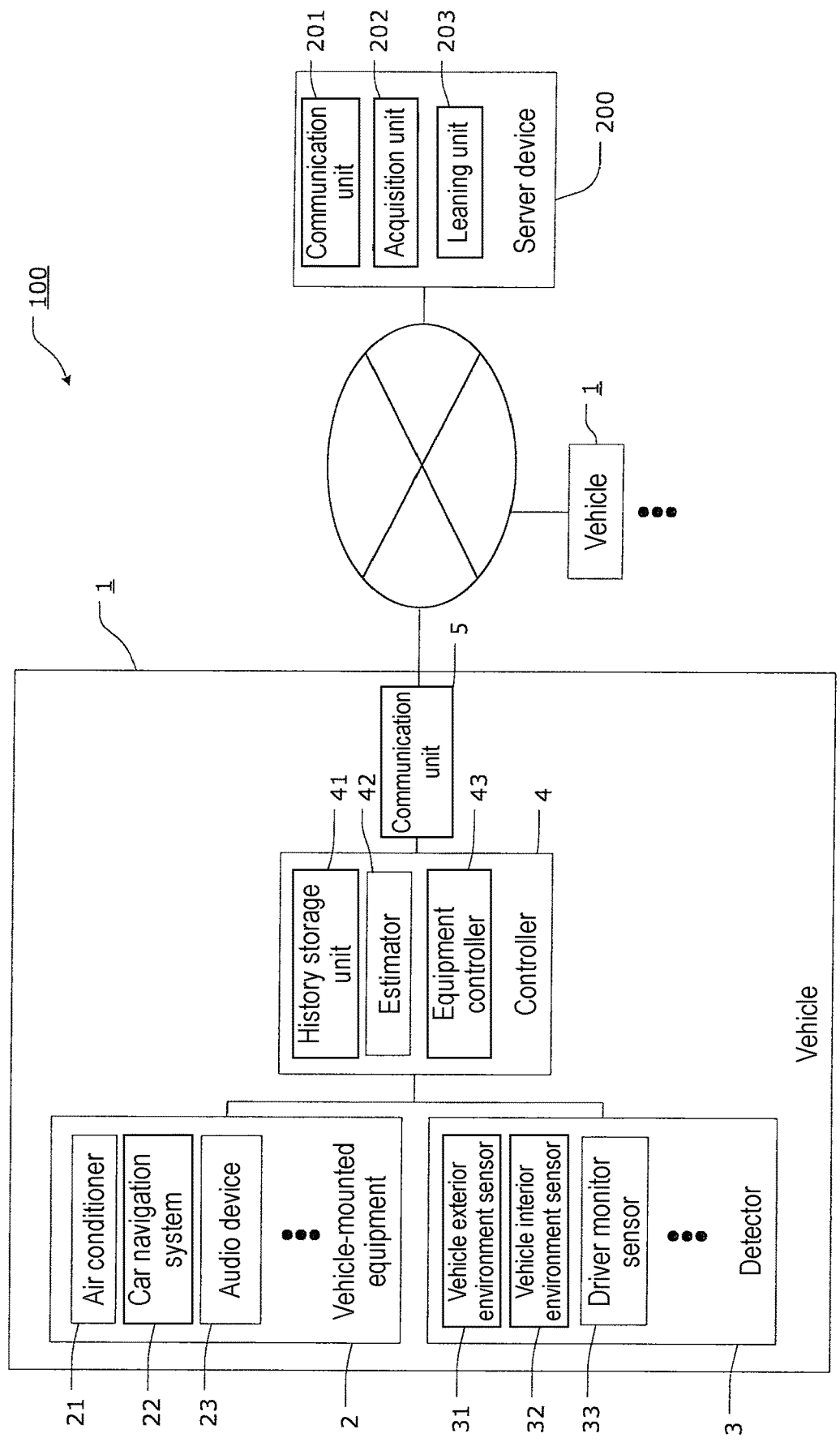
FIG. 1 is a block diagram illustrating a configuration of a principal portion of an information estimating system according to a first exemplary embodiment.

FIG. 1 is a block diagram illustrating a configuration of a principal portion of information estimating system 100 according to a first exemplary embodiment.

Information estimating system 100 includes vehicle 1, and server device 200 that vehicle 1 can communicate with via a network.

Vehicle 1 includes vehicle-mounted equipment 2, detector 3, controller 4, and communication unit 5.

Vehicle-mounted equipment 2 includes various devices mounted on vehicle 1. Specifically, vehicle-mounted equipment 2 includes devices which are not directly involved in traveling of vehicle 1. Vehicle-mounted equipment 2 includes air conditioner 21, car navigation system 22, and audio device 23. Vehicle-mounted equipment 2 also includes other devices such as windshield wipers, windows, side mirrors, and lights, although not illustrated. Each piece of vehicle-mounted equipment 2, upon being operated by the driver, outputs an operation item to controller 4. The operation item includes ON and OFF of vehicle-mounted equipment 2 and various setting of vehicle-mounted equipment 2 in the ON state.

Car navigation system 22 included in vehicle-mounted equipment 2 is a navigation system configured to guide vehicle 1 to a destination, and also functions as a notifier that notifies various information relating to vehicle 1. The notifier may be any device of vehicle-mounted equipment 2, which has an information transmitting function, other than car navigation system 22. Specifically, the notifier may be: a display for displaying information, including a light emitting element such as a light emitting diode (LED) provided on a head-up display, a center display, a steering wheel, and a pillar; a speaker for notifying the driver of information by converting the information into a sound; or a vibrator provided on a position (for example, a seat for the driver, a steering wheel, and the like) where the driver can sense the vibration. Alternatively, a combination of these components is also applicable as the notifier.

Detector 3 is configured to detect a vehicle environment state including at least one of a traveling state of vehicle 1 and a peripheral status of vehicle 1 at a current time point (predetermined time point). Detector 3 outputs the vehicle environment state to controller 4. More specifically, detector 3 is a sensor group configured to detect the vehicle environment state of vehicle 1. Detector 3 includes vehicle exterior environment sensor 31, vehicle interior environment sensor 32, and driver monitor sensor 33.

Vehicle exterior environment sensor 31 is a sensor configured to detect an environment of an exterior of vehicle 1. Specifically, vehicle exterior environment sensor 31 includes a global positioning system (GPS) sensor configured to acquire position information, a controller area network (CAN) information acquisition unit configured to acquire CAN information, a vehicle exterior temperature and moisture sensor configured to detect temperatures and moistures of the exterior of vehicle 1, a vehicle exterior illuminance sensor configured to detect illuminance of the exterior of the vehicle, and an advanced driver assistance systems (ADAS) information acquisition unit configured to acquire ADAS information.

The CAN information is acquired from each of electronic control units of vehicle 1. The CAN information includes, for example, a time elapsed since the driver rides on the vehicle, a state of an operation of the windshield wipers, a state of an operation of lights, a vehicle velocity, and a remaining amount of gasoline.

The ADAS information includes positions and sizes of other vehicles present in the periphery of vehicle 1, and relative speeds between other vehicles and vehicle 1. Specifically, the ADAS information includes information on positions of other vehicles and lanes present in the periphery of vehicle 1 acquired by a millimeter-wave radar, a laser radar, a camera, or the like mounted on vehicle 1.

Vehicle interior environment sensor 32 is configured to detect an environment of an interior of vehicle 1. Specifically, vehicle interior environment sensor 32 includes a vehicle interior temperature and moisture sensor configured to detect temperatures and moistures in the interior of vehicle 1, and a vehicle interior illuminance sensor configured to detect the illuminance in the interior of the vehicle.

Driver monitor sensor 33 is configured to detect a feature quantity of the driver. Specifically, driver monitor sensor 33 is a camera installed in vehicle 1. Examples of the feature quantity of a driver include, for example, individual authentication, a visual line, a behavior, a posture, breathing, cardiac beat, pulse wave, and hot or cool sense, of the driver.

The vehicle environment state is a combination of the vehicle exterior environment detected by vehicle exterior environment sensor 31, the vehicle interior environment detected by vehicle interior environment sensor 32, and a feature quantity of the driver detected by driver monitor sensor 33.

Controller 4 includes a central processing unit (CPU), a read only memory (ROM), and a random access memory (RAM), not illustrated, and controls the respective components by deploying a program stored in the ROM into the RAM by the CPU. Specifically, controller 4 is provided with history storage unit 41, estimator 42, and equipment controller 43.

History storage unit 41 includes operation items for respective pieces of vehicle-mounted equipment 2 and vehicle environment states during operations of the respective operation items, and stores in one-to-one correspondence as a personal operation history.

FIG. 2 is an explanatory diagram illustrating one example of the personal operation history according to the first exemplary embodiment. FIG. 2 illustrates an extraction of part of the personal operation history. As illustrated in FIG. 2, when the driver "turns up an audio volume", "opens a window", and "turns off the air-conditioner", in this order, the vehicle environment states at the timings of operation of the respective operation items are stored.

Estimator 42 estimates an operation item for a vehicle environment state at a predetermined time point of a specific driver. As used herein the term "specific driver" means a driver riding on vehicle 1. An estimation process by estimator 42 will be described later.

Equipment controller 43 controls vehicle-mounted equipment 2 based on the operation items estimated by estimator 42. Specifically, equipment controller 43 selects a peace of vehicle-mounted equipment 2 corresponding to the estimated operation item from the plurality of pieces of vehicle-mounted equipment 2, and causes vehicle-mounted equipment 2 to execute the operation item. At the time of this control, the estimated operation item is automatically executed even though the driver does not directly operate vehicle-mounted equipment 2. Note that equipment controller 43 may be configured to urge the driver to operate as described above by notifying the estimated operation item by the notifier without automatic execution.

Communication unit 5 is a communication interface connected to a wireless local area network (LAN), and is communicable with server device 200 via a network. Specifically, communication unit 5 transmits the personal operation history to server device 200 via the network and receives a learned result in server device 200.

Server device 200 will be described now.

As illustrated in FIG. 1, server device 200 is, for example, a cloud server, and includes communication unit 201, acquisition unit 202, and learning unit 203.

Communication unit 201 is a communication interface connected to a wireless LAN, and is communicable with vehicle 1 via the network. Specifically, communication unit 201 transmits the learned result learned by learning unit 203 to controller 4 of vehicle 1 via the network, and receives the personal operation history from vehicle 1.

Acquisition unit 202 acquires the personal operation histories of the plurality of drivers received from respective vehicles 1 via the network. Specifically, acquisition unit 202 is a memory unit such as a hard disc device or a solid state drive (SSD) and stores the acquired personal histories of the respective plurality of drivers.

Learning unit 203 is provided with a CPU, a ROM, and a RAM, not illustrated, and executes learning (machine learning) based on the personal operation histories of the plurality of drivers from acquisition unit 202 by deploying and executing the program stored in the ROM into the RAM by the CPU. Based on the learned result, estimator 42 is enabled to estimate the operation item of the driver at the current time point. A case of using a driver model will be described as one example of learning. In the following description, the vehicle environment state and the operation item are simplified for making the description easy to understand.

The driver model is constructed in such a way that tendencies of operation items to be performed by a driver for vehicle-mounted equipment 2 is modeled based on information relating to the frequency of each operation item. The driver model is obtained by consolidating the personal operation histories of the plurality of drivers and constructed from the consolidated personal operation histories. Specifically, learning unit 203 models the personal operation histories of the plurality of drivers acquired by acquisition unit 202 and constructs a driver model indicating a relationship between operation items of at least part of the plurality of drivers acquired by acquisition unit 202 and vehicle environment states as a learned result.

FIG. 3 is a diagram illustrating one example of the personal operation history according to the first exemplary embodiment. FIG. 3 illustrates that in a case where the current position of vehicle 1 is "a latitude of 35 degrees, a longitude of 135 degrees", driver x selects candidates of operation items, "turning up the audio volume", "opening a window", "turning off the air-conditioner" by three times, one time, and five times, respectively as a vehicle environment state. FIG. 3 also illustrates that in a case where the current position of vehicle 1 is "a latitude of 40 degrees, a longitude of 135 degrees", driver x selects candidates of operation items, "turning up the audio volume", "opening a window", "turning off the air conditioner" by two times, two times, and one time, respectively as a vehicle environment state. The same is applied to driver y.

The driver model is classified into a clustering type constructed by clustering personal operation histories of a plurality of drivers, and an individually-adapted type in which a driver model of a specific driver (for example, driver x) is constructed from a plurality of personal operation histories similar to the personal operation history of driver x.

Firstly, the clustering type will be described. The clustering type driver model is constructed in such a way that personal operation histories of the plurality of drivers illustrated in FIG. 3 are consolidated in advance. Then, a plurality of drivers having a high degree of similarity between the personal operation histories, that is, a plurality of drivers having a similar operation tendency, is grouped to construct a driver model.

FIG. 4 is a diagram illustrating a method for constructing a clustering type driver model according to the first exemplary embodiment. FIG. 4 illustrates the personal operation histories of drivers a to f in tabular form. FIG. 4 illustrates that, from the personal operation histories of drivers a to f, model A is constructed based on the personal operation histories of drivers a to c, and model B is constructed based on the personal operation histories of drivers d to f.

The degree of similarity between personal operation histories may be obtained such that: for example, frequencies (numerical values) in the personal operation histories of driver a and driver b are treated as frequency distributions; a correlation value in the respective frequency distributions is calculated; and the calculated correlation value is set as the degree of similarity. In this case, when the correlation value calculated from the personal operation histories of driver a and driver b is higher than a predetermined value, for example, the personal operation histories of driver a and driver b are grouped into a single group.

Note that the calculation of the degree of similarity is not limited thereto. For example, the degree of similarity may be calculated based on the same number of the behavior having the highest frequency in the personal operation history of driver a and the personal operation history of driver b.

Then, the clustering type driver model is constructed by calculating the average of the frequencies of respective behaviors in the personal operation histories of the drivers in each group, for example.

FIG. 5 is a diagram illustrating one example of the constructed clustering type driver model according to the first exemplary embodiment. The average frequency of the personal operation history in each group is derived by calculating the average of the frequencies of respective behaviors in the personal operation histories of the drivers in each group illustrated in FIG. 5. In this way, the clustering type driver model is constructed using the average frequency of behavior for the operation items determined for each vehicle environment state.

It is to be noted that the driver model may be constructed using only the operation item having the highest frequency from among the calculated average frequencies. FIG. 6 is a diagram illustrating another example of the constructed clustering type driver model according to the first exemplary embodiment. As illustrated in FIG. 6, the most frequent operation item is selected for each vehicle environment state, and the driver model is constructed using the selected operation item.

Now, a method for using the constructed clustering type driver model will be described with examples.

The driver model illustrated in FIG. 5 is stored in advance in acquisition unit 202 of server device 200. Learning unit 203 calculates the degree of similarity between the personal operation history of driver y and the personal operation history of each model in the driver model to determine which model is the most suitable for driver y. For example, regarding the personal operation history of driver y illustrated in FIG. 3 and the driver model illustrated in FIG. 5, learning unit 203 determines that model B is the most suitable for driver y. Then, learning unit 203 transmits model B to estimator 42 of vehicle 1 via the network from communication unit 201 as a learned result. Estimator 42 estimates an operation item for the vehicle environment state of a specific driver y at a predetermined time point based on model B. Specifically, when the frequency of the estimated operation item does not exceed the predetermined threshold, the operation item is not employed. In other words, only operation items estimated to have frequencies exceeding the predetermined threshold are employed. For example, the predetermined threshold is assumed to be "4". In the case of model A, the operation item "turning off the air conditioner" is employed in the vehicle environment state of "a latitude of 35 degrees, a longitude of 135 degrees", and the operation item "turning off the air conditioner" is employed in the vehicle environment state of "a latitude of 40 degrees, a longitude of 135 degrees". In the case of model B, the operation item "turning up the audio volume" is employed in the vehicle environment state of "a latitude of 35 degrees, a longitude of 135 degrees", and the operation item "turning up the audio volume" is employed in the vehicle environment state of "a latitude of 40 degrees, a longitude of 135 degrees". Here, the frequency is employed as a criterion, but a frequency of appearance may be employed as the criterion.

For example, as illustrated in FIG. 3, even when the number of frequency of the operation item in the vehicle environment state of "a latitude of 40 degrees, a longitude of 135 degrees" in the personal operation history of driver y is "0", that is, when driver y has never selected the operation items of "turning up the audio volume" and "opening a window" in the vehicle environment state of "a latitude of 40 degrees, a longitude of 135 degrees", estimator 42 may estimate "turning up the audio volume" as the current operation item in the vehicle environment state of "a latitude of 40 degrees, a longitude of 135 degrees" based on model B illustrated in FIG. 5.

Next, the individually-adapted type will be described. The individually-adapted type driver model is constructed in such a way that personal operation histories of the plurality of drivers illustrated in FIG. 3 are consolidated in advance, as in the method for constructing the clustering type. The individually-adapted type is different from the clustering type in that the driver model is constructed for each driver. Hereinafter, an example of constructing the driver model for driver y will be described.

Firstly, personal operation histories of the plurality of drivers having a high degree of similarity with the personal operation history of driver y are extracted from the consolidated personal operation histories of the plurality of drivers. Then, the driver model for driver y is constructed from the extracted personal operation histories of the plurality of drivers.

Figure 7:
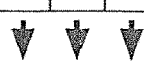
FIG. 7 is a diagram illustrating a method for constructing an individually-adapted type driver model according to the first exemplary embodiment.

FIG. 7 is a diagram illustrating a method for constructing an individually-adapted type driver model according to the first exemplary embodiment. As in FIG. 4, FIG. 7 illustrates the personal operation histories of drivers a to f in tabular form. FIG. 7 also illustrates that the driver model for driver y is constructed from the personal operation histories of drivers c to e having a high degree of similarity with the personal operation history of driver y illustrated in FIG. 3.

The individually-adapted type driver model is constructed by calculating the average of the frequencies in the extracted personal operation histories of the drivers.

FIG. 8 is a diagram illustrating one example of the constructed individually-adapted type driver model according to the first exemplary embodiment. In the personal operation history of driver y illustrated in FIG. 3 and the personal operation histories of drivers c to e illustrated in FIG. 7, the average frequency of each operation item is derived for each vehicle environment state. In this way, the individually-adapted type driver model for driver y is constructed using the average frequency for the operation item corresponding to each vehicle environment state.

Now, a method for using the constructed individually-adapted type driver model will be described with examples.

The driver model of driver y illustrated in FIG. 8 is stored in advance in acquisition unit 202 of server device 200. Learning unit 203 determines that an operation item having the highest frequency is the most suitable operation item for driver y in each vehicle environment state of the driver model of driver y.

In this way, the operation item more suitable for the driver can be estimated by constructing in advance the driver model for each driver from the personal operation histories of the plurality of drivers.

For example, as illustrated in FIG. 3, even when the number of frequency of the operation item in the vehicle environment state of "a latitude of 40 degrees, a longitude of 135 degrees" in the personal operation history of driver y is "0", that is, when driver y has never selected the operation items of "turning up the audio volume" and "opening a window" in the vehicle environment state of "a latitude of 40 degrees, a longitude of 135 degrees", estimator 42 may estimate "turning off the air conditioner" as the current operation item in the vehicle environment state of "a latitude of 40 degrees, a longitude of 135 degrees" based on model of driver y illustrated in FIG. 8.

The driver model described above is constructed in such a way that the operation item tendency of a driver for each vehicle environment state is modeled based on information relating to the frequency of selection of each operation item. However, the present invention is not limited thereto. For example, the driver model may be constructed based on a personal operation history in which an environmental parameter indicating a vehicle environment state (i.e., situation) in the past and the operation item that the driver has actually selected in the vehicle environment state are associated with each other. When the environmental parameter is incorporated into the driver model, options can be determined without going through the procedure for individually performing detection and labeling of the vehicle environment state and inputting (storing) the labeling result in the driver model.

The construction of the driver model has been described thus far with simplified vehicle environment state and the operation item. For further complex example, when the parameter is a continuous value, the table as FIG. 3 cannot be created. In such a case, a driver model is constructed by learning with the vehicle environment state employed as the input value and operation items employed as output values.

Specifically, in the case of the clustering type, the drivers may be classified into a plurality of clusters by using a mixed distribution model. In other words, a plurality of the drivers may be classified into several clusters by classifying drivers having the same data distribution into the same cluster, and the plurality of drivers having different data distributions into different clusters. Furthermore, a learning model of each cluster corresponds to each driver model. When an estimation is made on a certain vehicle, a personal operation history and each driver model of each cluster are collated for a target driver, and the nearest cluster is selected to determine the driver model. In the case of individually-adapted type, a plurality of items of representative data are prepared and retained for each driver. When an estimation is made on a certain vehicle, drivers having a high correlation with the target driver are extracted to create a group. Learning is performed from the personal operation histories of the drivers included in this group, and a driver model is created. The learning to be performed at this time may be any of random forest, gradient boosting method, and support vector machine (SVM).

The obtained driver model is a learning model employing the vehicle environment state as the input value and each operation item as the output value. Therefore, by inputting the vehicle environment state acquired from a sensor or the like at the time of estimation, a likelihood may be output for each operation item. This operation is performed constantly or at intervals, and the operation may be estimated when the likelihood exceeds the threshold.

The obtained estimation result may be recommended via a sound or a display device such as "turn up the volume?". The driver can execute the operation only by replying "Yes or No" via the sound or a steering switch.

When the answer is No at this time, the result is re-learned to enhance the accuracy.

Next, other examples of the vehicle environment state and examples of operation items that may be estimated by the vehicle environment state will be described.

Figure 9:
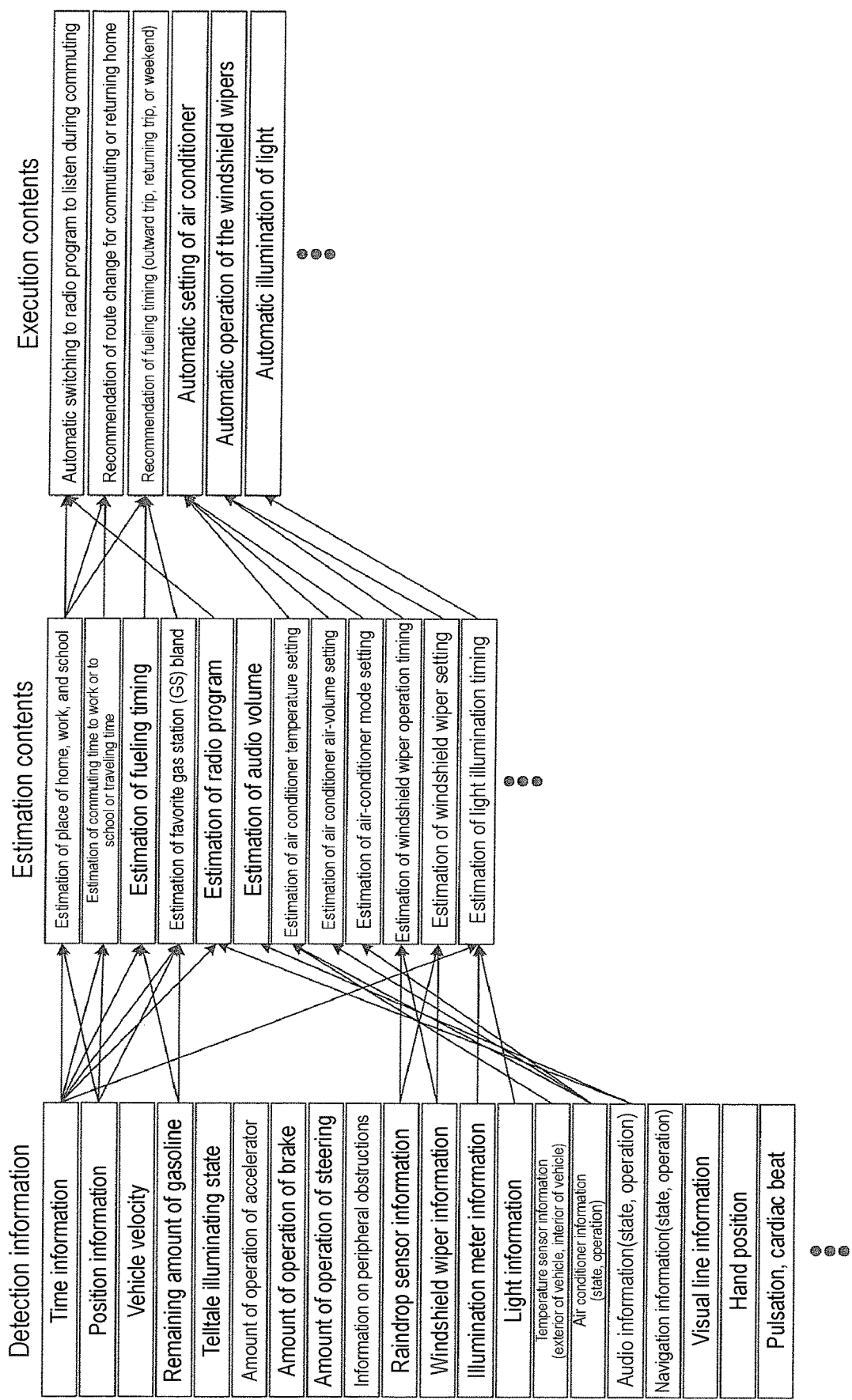
FIG. 9 is a diagram illustrating a relationship among detection information, estimation contents, and execution contents according to the first exemplary embodiment.

FIG. 9 is a diagram illustrating a relationship among detection information, estimation contents, and execution contents according to the first exemplary embodiment.

As used herein, the term "detection information" means items of information to be detected by detector 3. The detection information includes "time information", "position information", "vehicle velocity", "remaining amount of gasoline", "a telltale illumination state", "amount of operation of accelerator", "amount of operation of brake", "amount of operation of steering", "information on peripheral obstructions", "raindrop sensor information", "windshield wiper information", "illumination meter information", "light information", "temperature sensor information", "air conditioner information", "audio information", "navigation information", "visual line information", "hand position", and "pulsation, cardiac beat". The "visual line information", "hand position", and "pulsation, cardiac beat" are feature quantities of drivers detected by driver monitor sensor 33.

The estimation contents are items that can be estimated based on the detection information. The estimation contents include "estimation of place of home, work, and school", "estimation of commuting time to work or to school or traveling time", "estimation of fueling timing", "estimation of favorite gas station (GS) bland", "estimation of radio program", "estimation of audio volume", "estimation of air conditioner temperature setting", "estimation of air conditioner air-volume setting", "estimation of air conditioner mode setting", "estimation of windshield wiper operation timing", "estimation of windshield wiper setting", and "estimation of light illumination timing".

The execution contents are items to be executed by vehicle 1 based on the estimation contents. The execution contents include "automatic switching to a radio program to listen during commuting" "recommendation of route change for commuting or returning home", "recommendation of fueling timing (outward trip, returning trip, or weekend)", "automatic setting of air cooling for summer driving", "automatic setting of air heating for winter driving", "automatic operation of windshield wipers", and "automatic illumination of light".

Arrows in FIG. 9 indicate relationships of respective items. Specifically, items of detection information required for estimating the estimation contents are connected by the arrows. The estimation contents required for determining the execution contents are connected by the arrows. For example, for determining the execution content "automatic switching to a radio program to listen during commuting", estimation contents of "estimation of place of home, work, and school" and "estimation of radio program" are used. For the estimation of "estimation of place of home, work, and school", "time information", and "position information" are used, and for "estimation of radio program", "time information" and "audio information" are used. For each estimation, a driver model suitable for the estimation is constructed. Therefore, the driver model enables estimation of a radio program reflecting operation tendencies of other drivers similar to the operation tendency of the driver (user) driving vehicle 1, but not selection of a radio program matching a preference of the user. In other words, the radio program matching the user is automatically switched depending on the vehicle environment state although the user is not intended to do so.

For determining the execution contents of "recommendation of fueling timing", estimation contents of "estimation of place of home, work, and school", "estimation of fueling timing", and "estimation of favorite GS bland" are used. For the estimation of "estimation of place of home, work, and school", "time information" and "position information" are used. For the estimation of "estimation of fueling timing", "time information" and "remaining amount of gasoline" are used. For the estimation of "estimation of favorite GS bland", "time information", "position information" and "remaining amount of gasoline" are used. For the estimation of these items, the driver models suitable for the estimation are constructed. Therefore, the fueling timing may be estimated by reflecting not only the tendency of the fueling timing of the user, but also the tendencies of the fueling timing of other drivers. In other words, the user is notified of fueling at the gas station matching the preference of the user even during traveling in an unknown area.

For determining the execution contents of "automatic setting of air conditioner", estimation contents of "estimation of air conditioner temperature setting", "estimation of air conditioner air-volume setting", and "estimation of air conditioner mode setting" are used. For the estimation of "estimation of air conditioner temperature setting", "temperature sensor information" and "air conditioner information" are used. For the estimation of "estimation of air conditioner air-volume setting", "air conditioner information" is used. For "estimation of air conditioner mode setting", "air conditioner information" is used. For the estimation of these items, the driver models suitable for the estimation are constructed. Therefore, the air conditioner setting may be estimated by reflecting not only the operation tendency of the user, but also the operation tendency for air conditioner of other drivers. Note that finer estimation is enabled by using "time information", "position information", "visual line information", "hand position", and "pulsation, cardiac beat" in addition to the above-described setting.

Other execution contents that can be executed by estimation will be described.

For example, when the audio volume is estimated based on the peripheral sound volume, the vehicle velocity, the window state, and the air conditioner air-volume setting, the audio volume may be adjusted with the noise during traveling taken into account.

When the audio volume is estimated based on the reproduced content being reproduced by audio device, the audio volume may be adjusted for each reproduced content type.

When the operation item is estimated for car navigation system 22 based on the feature quantity of the driver, the contents of notification of car navigation system 22 may be controlled in conjunction with a posture of the driver. Specifically, scrolling with movement of the visual line of the driver, or sound outputting of a current position or a road condition is enabled.

In addition, when a mirror operation is assumed based on the ADAS information, the position information, the vehicle velocity, and a gear position, the orientation of mirrors may be controlled based on the traveling state of vehicle 1. Specifically, an inclination of mirrors may be controlled when vehicle 1 is moving backward.

When selection of the reproduced content is estimated based on the amount of operation of accelerator, the amount of operation of brake, and the amount of operation of steering, the reproduced content may be controlled depending on acceleration or deceleration and a steering speed of vehicle 1.

When the window operation is estimated based on the position information, the window operation may be controlled in association with the position information. More specifically, control may be performed to open a window automatically when the position information near a parking ticket machine in a parking lot that the user often uses is detected.

Figure 10:
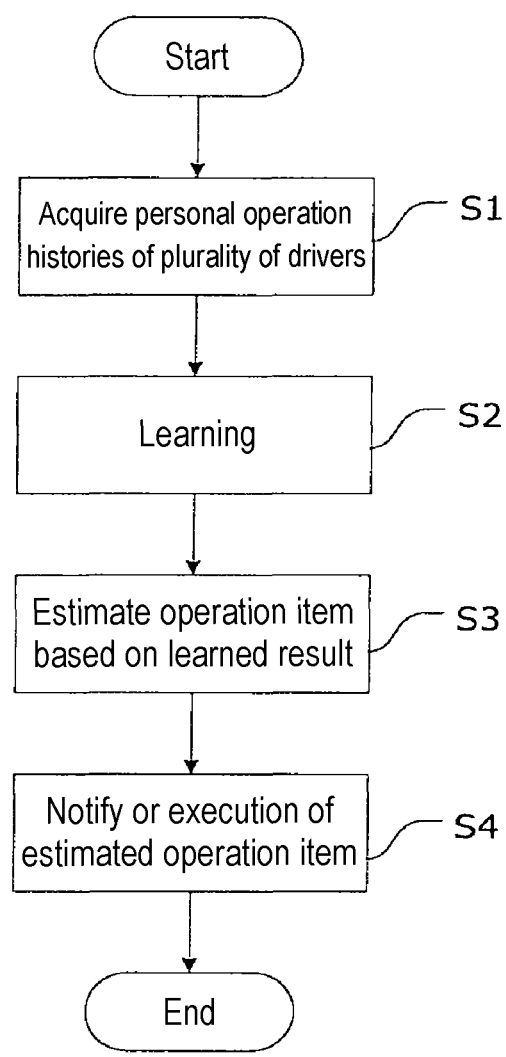
FIG. 10 is a flowchart illustrating a flow of an information estimating method according to the first exemplary embodiment.

Referring to a flowchart in FIG. 10, an information estimating method according to the first exemplary embodiment will be described. FIG. 10 is a flowchart illustrating a flow of the information estimating method according to the first exemplary embodiment. In vehicle 1 and server device 200, the information estimating method is performed based on programs stored respectively in vehicle 1 and server device 200. When the program is executed, controller 4 of vehicle 1 constantly transmits the personal operation history of the driver from communication unit 5 to server device 200 via a network. In server device 200, the personal operation histories are transmitted from a plurality of vehicles 1 via the network, whereby acquisition unit 202 acquires the personal operation history of each of the plurality of drivers (step S1).

Next, learning unit 203 learns operation items and the vehicle environment state in each of the personal operation histories acquired for the plurality of drivers in association with each other, and transmits the learned result to estimator 42 of each vehicle 1 (step S2).

Estimator 42 estimates operation item for the vehicle environment state of a specific driver at a predetermined time point based on the learned result learned by learning unit 203 (step S3).

After the estimation, equipment controller 43 notifies or executes the operation item estimated by estimator 42. Specifically, equipment controller 43 selects a peace of vehicle-mounted equipment 2 corresponding to the estimated operation item from the plurality of pieces of vehicle-mounted equipment 2 and causes vehicle-mounted equipment 2 to execute the operation item (step S4). Accordingly, the estimated operation item is automatically operated. Equipment controller 43 urges the driver to operate as described above by notifying the estimated operation item by the notifier. Performing only one of the automatic operation and the notification is also applicable.

As described above, information estimating system 100 according to the present exemplary embodiment includes acquisition unit 202 configured to acquire an operation item for vehicle-mounted equipment 2 mounted on vehicle 1 and vehicle environment state, which is at least one of the peripheral status of vehicle 1 and the traveling state of the vehicle when the operation item is operated for each of the plurality of drivers, learning unit 203 configured to learn the operation item and the vehicle environment state of each of the plurality of drivers acquired by acquisition unit 202 in association with each other, and estimator 42 configured to estimate the operation item for the vehicle environment state at the predetermined time point of the specific driver based on the learned result learned by learning unit 203.

An information estimating method according to the present exemplary embodiment includes acquiring an operation item for vehicle-mounted equipment 2 mounted on vehicle 1 and vehicle environment state, which is at least one of the status of vehicle 1 and the traveling state of the vehicle when the operation item is operated for each of the plurality of drivers, learning the operation item and the vehicle environment state of each of the plurality of drivers acquired in association with each other, and estimating the operation item for the vehicle environment state at the predetermined time point of the specific driver based on the learned result.

A program according to the present exemplary embodiment causes a computer to execute: acquiring an operation item for the vehicle-mounted equipment mounted on vehicle 1 and vehicle environment state, which is at least one of the status of the vehicle and the traveling state of the vehicle when the operation item is operated for each of the plurality of drivers, learning the operation item and the vehicle environment state of each of the plurality of drivers acquired in association with each other, and estimating the operation item for the vehicle environment state at the predetermined time point of the specific driver based on the learned result.

In this configuration, since learning unit 203 learns the operation item and the vehicle environment state of each of the plurality of drivers acquired by acquisition unit 202 in association with each other, learning considering not only the operation item of the specific driver, but also the operation items of other drivers is enabled. Then, based on the learned result, estimator 42 estimates the operation item for the vehicle environment state of the specific driver at the predetermined time point. Accordingly, the tendency of the specific driver in terms of operation and tendencies of other drivers in terms of operation may be reflected to estimate the operation item of the specific driver at the predetermined time point. Therefore, the operation with respect to vehicle-mounted equipment 2 suitable to the status of the driver may be estimated without using the visual line of the driver.

Information estimating system 100 is further provided with detector 3 configured to detect the vehicle environment state at the predetermined time point. Acquisition unit 202 acquires the personal operation history in which the operation item and the vehicle environment state are in one-to-one correspondence for each of the plurality of drivers. Learning unit 203 models the personal operation histories of the plurality of drivers acquired by acquisition unit 202 and constructs a driver model indicating a relationship between operation items of at least part of the plurality of drivers and vehicle environment states as a learned result. In the driver model constructed by learning unit 203, estimator 42 determines the operation item associated with the vehicle environment state detected by detector 3 as the operation item for the vehicle environment state of the specific driver at the predetermined time point.

In this configuration, the operation item of the specific driver at the predetermined time point may be estimated by using the driver model. Therefore, even when the available personal operation history of the specific driver is not sufficient for estimation of the operation item, the operation item of the specific driver at the predetermined time point may be estimated.

In addition, when the frequency of the estimated operation item does not exceed the predetermined threshold, estimator 42 does not employ the operation item.

In this configuration, when the frequency of the estimated operation item does not exceed the predetermined threshold, estimator 42 does not employ the operation item. In other words, the estimator employs the operation item when the frequency of the estimated operation item exceeds the predetermined threshold, and thus employs the operation item in which the tendencies of the plurality of drivers stand out.

Information estimating system 100 includes a notifier (car navigation system 22) configured to notify the operation item estimated by estimator 42.

In this configuration, the estimated operation item is notified by the notifier, and thus the driver can figure out which operation item is executed in advance. Even when the operation item is not operated automatically, the driver may be prompted to perform a recommended operation by the notification of the operation item.

Information estimating system 100 is also provided with equipment controller 43 configured to control vehicle-mounted equipment 2 based on an operation item estimated by estimator 42.

In this configuration, since equipment controller 43 controls vehicle-mounted equipment 2 based on the operation item estimated by estimator 42, the estimated operation item may be executed automatically.

Second Exemplary Embodiment

In the first exemplary embodiment, a case where the driver monitor is constructed is exemplified for description of learning. In a second exemplary embodiment, a case of using a neural network as learning will be described. Parts equivalent to the first exemplary embodiment may be denoted by the same reference signs and description may be omitted.

Figure 11:
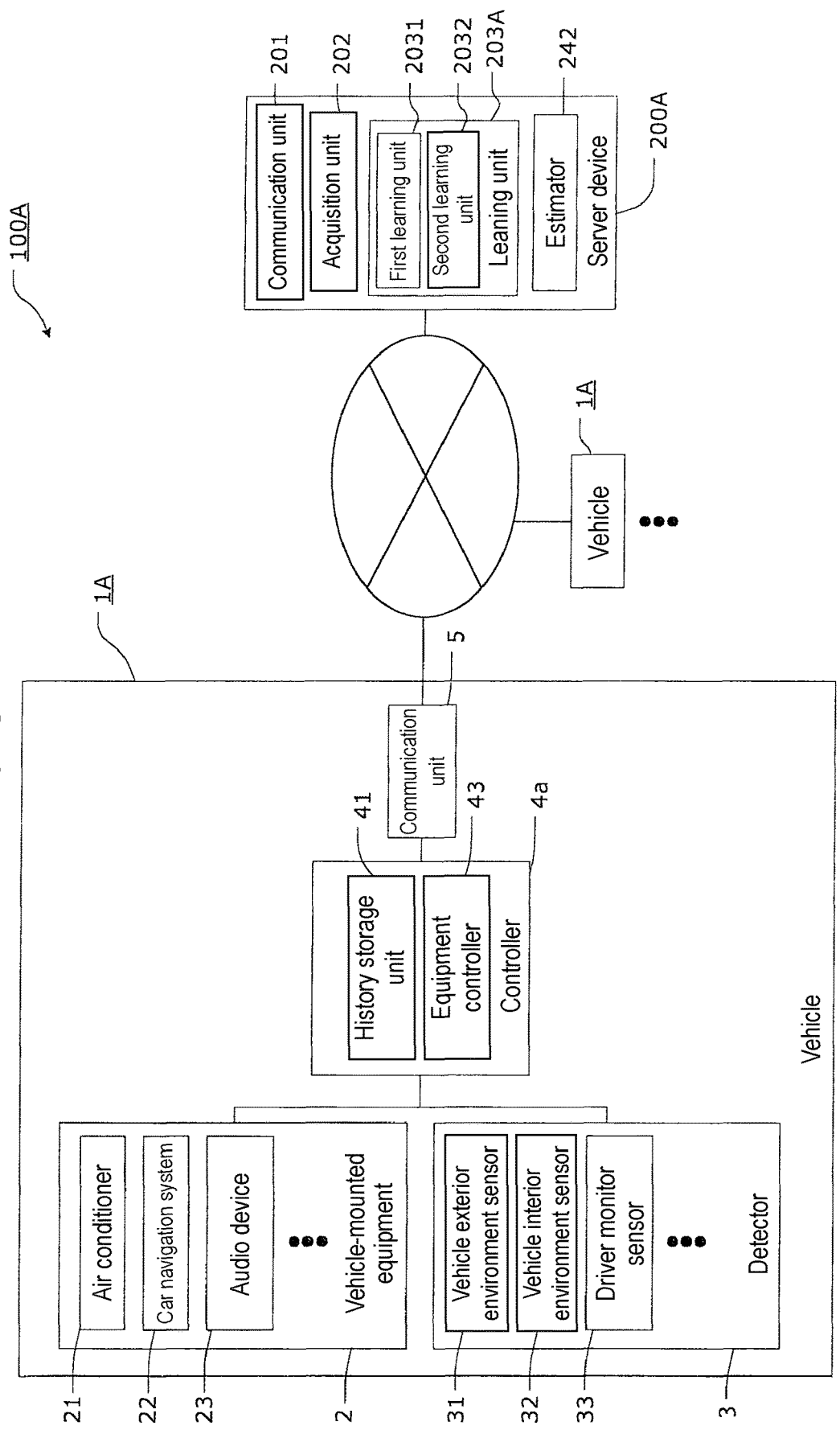
FIG. 11 is a block diagram illustrating a configuration of a principal portion of an information estimating system according to a second exemplary embodiment.

FIG. 11 is a block diagram illustrating a configuration of a principal portion of information estimating system 100A according to the second exemplary embodiment. Information estimating system 100A according to the second exemplary embodiment is generally equivalent to information estimating system 100 of the first exemplary embodiment but is different from information estimating system 100 of the first exemplary embodiment in that the estimator is eliminated from controller 4a of vehicle 1A, in that estimator 242 is provided in server device 200A, and in that a configuration of learning unit 203A is different. In other words, information estimating system 100A according to the second exemplary embodiment is configured to execute the procedure up to estimation by server device 200A, and transmit the result of estimation to vehicle 1A.

Learning unit 203A of server device 200A includes first learning unit 2031 and second learning unit 2032. First learning unit 2031 makes the neural network learn a relationship between a vehicle environment state and an operation item acquired by acquisition unit 202 (personal operation history) for each of a plurality of drivers. Second learning unit 2032 uses the vehicle environment state and the operation item acquired by acquisition unit 202 for a specific driver to construct a dedicated neural network for the specific driver as a learned result. Estimator 242 estimates the operation item for the vehicle environment state of the specific driver at a predetermined time point based on the dedicated neural network as the learned result.

In this configuration, since the operation item of the specific driver at the predetermined time point may be estimated by using the neural network, the estimation is achieved adequately.

The learning using the neural network may employ the contents of known machine learning. For example, the same estimation of operation is achieved by constructing the neural network which provides histograms of respective operation items by inputting the vehicle environment state.

Other Exemplary Embodiment

As described above, the first to second exemplary embodiments have been described as illustration of the technique disclosed in this application. However, the technique of the present embodiments are not limited thereto, but are applicable to another exemplary embodiment in which a change, a replacement, an addition, or an omission is appropriately made. In addition, new exemplary embodiments can be made by combining constituents described in the above described exemplary embodiments.

For example, in the first and second exemplary embodiments described above, cases where information estimating systems 100, 100A are provided with vehicle 1 and server devices 200, 200A, respectively have been described. However, the vehicle may be an information estimating system. In this case, the information estimating method is achieved only with the vehicle. In this case, the controller of the vehicle is provided with an acquisition unit and a learning unit. The acquisition unit may acquire the personal operation histories of other drivers by communication. A storage medium in which the personal operation histories of other drivers are stored may be connected to the controller of the vehicle to acquire the personal operation histories of other drivers from the storage medium.

While the exemplary embodiments of the present invention have been described above with reference to the drawings, the functions of the above devices and processors can be implemented by a computer program.

A computer that implements the above functions through the execution of the program includes an input device such as a keyboard, a mouse, and a touch pad, an output device such as a display and a speaker, a processor or a central processing unit (CPU), a storage device such as a read only memory (ROM), a random access memory (RAM), a hard disk device, and an solid state drive (SSD), a reading device that reads information from a recording medium such as a digital versatile disk read only memory (DVD-ROM) and a universal serial bus (USB) memory, and a network card that conducts communication through a network, and the respective elements are connected to one another through a bus.

The reading device reads the program from the recording medium having the program recorded thereon, and the storage device stores the program. Alternatively, the network card communicates with a server device connected to the network, and a program, which implements the respective functions of the above devices and is downloaded from the server device, is stored in the storage device.

Then, the processor or the CPU copies the program stored in the storage device on the RAM, sequentially reads commands included in the program from the RAM, and executes the read commands, whereby the functions of the respective devices are achieved.

INDUSTRIAL APPLICABILITY

The information estimating system, information estimating method, and program according to the present invention are applicable to a device or a system that processes information relating to operation for the vehicle-mounted equipment.

REFERENCE MARKS IN THE DRAWINGS 1, 1A: vehicle
2: vehicle-mounted equipment
3: detector
4, 4a: controller
5, 201: communication unit
21: air conditioner
23: audio device
31: vehicle exterior environment sensor
32: vehicle interior environment sensor
33: driver monitor sensor
22: car navigation system (notifier)
41: history storage unit
42, 242: estimator
43: equipment controller
100, 100A: information estimating system
200, 200A: server device
202: acquisition unit
203, 203A: learning unit
2031: first learning unit
2032: second learning unit

The invention claimed is:

1. An information estimating system comprising:
an acquisition circuit configured to acquire, for each of a plurality of drivers, (i) at least one operation item for each item of vehicle-mounted equipment mounted on a vehicle and (ii) at least one vehicle environment state including at least one of a peripheral status of the vehicle and a traveling state of the vehicle when the at least one operation item is operated;
a learning circuit configured to learn the at least one operation item and the at least one vehicle environment state of each of the plurality of drivers in association with each other to construct a learned result, the at least one operation item and the at least one vehicle environment state of each of the plurality of drivers being acquired by the acquisition circuit;
an estimator configured to determine an estimated operation item by estimating one of the at least one operation item for a vehicle environment state of a specific driver at a predetermined time point from the at least one vehicle environment state based on the learned result; and
a detector configured to detect the vehicle environment state of the specific driver at the predetermined time point from the at least one vehicle environment state and obtain a detected vehicle environment state, wherein
the acquisition circuit acquires at least one personal operation history including the at least one operation item and the at least one vehicle environment state in one-to-one correspondence for each of the plurality of drivers,
the learning circuit models the at least one personal operation history to construct a driver model indicating a relationship between the at least one operation item and the at least one vehicle environment state of at least part of the plurality of drivers as the learned result, the estimator determines one of the at least one operation item associated with the detected vehicle environment state as the estimated operation item for the vehicle environment state of the specific driver at the predetermined time point in the driver model,
the estimator is configured not to employ the estimated operation item when a frequency of the estimated operation item corresponding to the vehicle environment state at the predetermined time point for the specific driver does not exceed a predetermined threshold,
the estimated operation item being estimated by the driver model for the specific driver, and
the driver model is determined based on a degree of similarity between a personal operation history of the specific driver and the at least one personal operation history in the driver model.

2. The information estimating system according to claim 1, wherein the learning circuit comprises:
a first learning circuit configured to make a neural network learn the at least one vehicle environment state and the at least one operation item acquired by the acquisition circuit for each of the plurality of drivers in association with each other; and
a second learning circuit configured to use the at least one vehicle environment state and the at least one operation item acquired by the acquisition circuit for the specific driver and construct a dedicated neural network for the specific driver as the learned result, and
the estimator uses the dedicated neural network to obtain one of the at least one operation item for the vehicle environment state of the specific driver at the predetermined time point as the estimated operation item.

3. The information estimating system according to claim 1, further comprising a notifier configured to notify the estimated operation item by the estimator.

4. The information estimating system according to claim 1, further comprising an equipment controller configured to control any one of items of the vehicle-mounted equipment based on the estimated operation item.

5. An information estimating method comprising:
acquiring, for each of a plurality of drivers and by a processor, (i) at least one operation item for each item of vehicle-mounted equipment mounted on a vehicle and (ii) at least one vehicle environment state including at least one of at least one of a peripheral status of the vehicle and a traveling state of the vehicle when the at least one operation item is operated;
learning, by the processor, the at least one operation item and the at least one vehicle environment state of each of the plurality of drivers in association with each other to construct a learned result, the at least one operation item and the at least one vehicle environment state of each of the plurality of drivers being acquired by the acquiring;
determining, by the processor, an estimated operation item by estimating one of the at least one operation item for a vehicle environment state of a specific driver at a predetermined time point from the at least one vehicle environment state based on the learned result; and
detecting, by the processor, the vehicle environment state of the specific driver at the predetermined time point from the at least one vehicle environment state and obtain a detected vehicle environment state;
acquiring, by the processor, at least one personal operation history including the at least one operation item and the at least one vehicle environment state in one-to-one correspondence for each of the plurality of drivers;

modeling, by the processor, the at least one personal operation history to construct a driver model indicating a relationship between the at least one operation item and the at least one vehicle environment state of at least part of the plurality of drivers as the learned result;

determining, by the processor, one of the at least one operation item associated with the detected vehicle environment state as the estimated operation item for the vehicle environment state of the specific driver at the predetermined time point in the driver model; and configuring, by the processor, the driver model not to employ the estimated operation item when a frequency of the estimated operation item corresponding to the vehicle environment state at the predetermined time point for the specific driver does not exceed a predetermined threshold, wherein the estimated operation item is estimated by the driver model for the specific driver, and the driver model is determined based on a degree of similarity between a personal operation history of the specific driver and the at least one personal operation history in the driver model.

6. A non-transitory machine-readable recording medium that stores a program configured to cause a computer to execute:

acquiring, for each of a plurality of drivers and by a processor, (i) at least one operation item for each item of vehicle-mounted equipment mounted on a vehicle and (ii) at least one vehicle environment state including at least one of at least one of a peripheral status of the vehicle and a traveling state of the vehicle when the at least one operation item is operated;

learning, by the processor, the at least one operation item and the at least one vehicle environment state of each of the plurality of drivers in association with each other to construct a learned result, the at least one operation item and the at least one vehicle environment state of each of the plurality of drivers being acquired by the acquiring;

determining, by the processor, an estimated operation item by estimating one of the at least one operation item for a vehicle environment state of a specific driver at a predetermined time point from the at least one vehicle environment state based on the learned result;

detecting, by the processor, the vehicle environment state of the specific driver at the predetermined time point from the at least one vehicle environment state and obtain a detected vehicle environment state;

acquiring, by the processor, at least one personal operation history including the at least one operation item and the at least one vehicle environment state in one-to-one correspondence for each of the plurality of drivers;

modeling, by the processor, the at least one personal operation history to construct a driver model indicating a relationship between the at least one operation item and the at least one vehicle environment state of at least part of the plurality of drivers as the learned result;

determining, by the processor, one of the at least one operation item associated with the detected vehicle environment state as the estimated operation item for the vehicle environment state of the specific driver at the predetermined time point in the driver model; and configuring, by the processor, the driver model not to employ the estimated operation item when a frequency of the estimated operation item corresponding to the vehicle environment state at the predetermined time point for the specific driver does not exceed a predetermined threshold, wherein the estimated operation item is estimated by the driver model for the specific driver, and the driver model is determined based on a degree of similarity between a personal operation history of the specific driver and the at least one personal operation history in the driver model.

* * * * *